(No Model.) 2 Sheets—Sheet 1.

J. RAPIEFF.
METHOD OF FINDING THE RANGE OF DISTANT OBJECTS.

No. 441,974. Patented Dec. 2, 1890.

Witnesses
H. F. Parker.
Chas. Hanimann

Inventor
John Rapieff
By his Attorney
Chas. W. Forbes (No Model.)  2 Sheets—Sheet 2.

J. RAPIEFF.
METHOD OF FINDING THE RANGE OF DISTANT OBJECTS.

No. 441,974. Patented Dec. 2, 1890.

Witnesses
H. F. Parker
Chas. Hanimann

Inventor
John Rapieff
By his Attorney
Chas. W. Forbes

UNITED STATES PATENT OFFICE.

JOHN RAPIEFF, OF NEW YORK, N. Y.

METHOD OF FINDING THE RANGE OF DISTANT OBJECTS.

SPECIFICATION forming part of Letters Patent No. 441,974, dated December 2, 1890.

Application filed March 10, 1890. Serial No. 343,362. (No model.)

*To all whom it may concern:*

Be it known that I, JOHN RAPIEFF, a subject of the Czar of Russia, residing in the city, county, and State of New York, have invented certain new and useful Improvements in Methods of Finding the Range of Distant Objects, of which the following is a specification.

My invention relates to determining the range of a distant object and giving the indications at distant locations from the range-finding instrument.

My invention is applicable to alidade-arms or telescopes operated upon fixed angles of triangulation, being movable with relation to each other upon a variable base-line, as illustrated in my patent application, Serial No. 294,397, filed December 22, 1889.

My invention consists in determining a fractional portion of an electrical conducting body, which fractional portion bears in length a ratio to the variable base of the triangle included between two lines of sight directed upon a distant object and said base-line and in measuring the electrical resistance of the said length.

Figure 1:
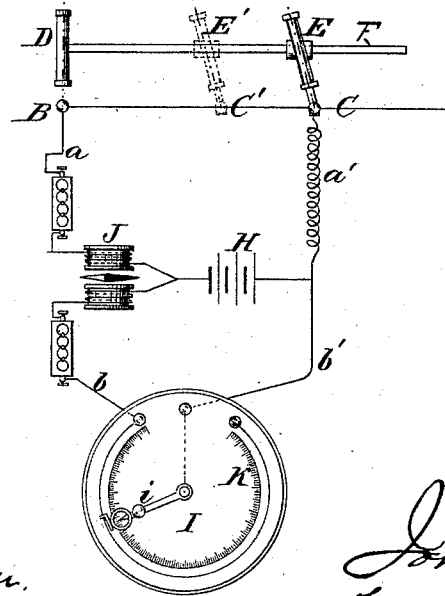
Figure 2:
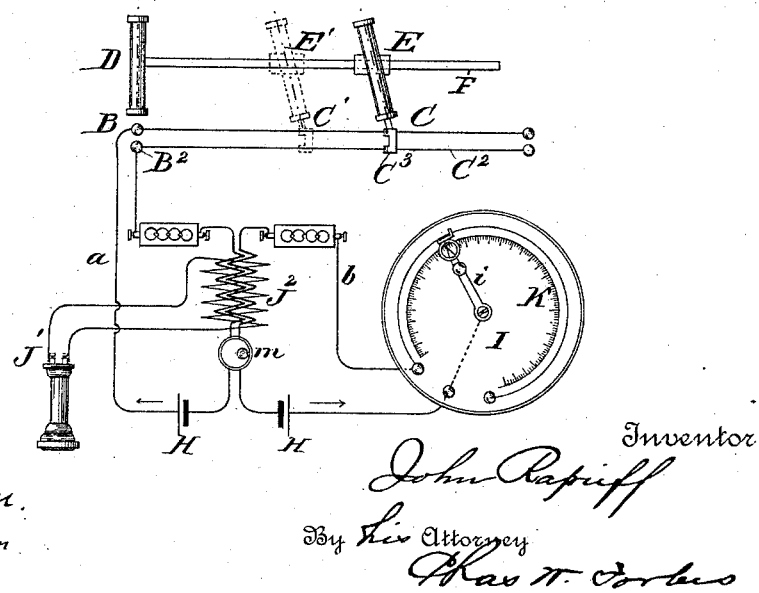

In the drawings, in which similar letters of reference indicate like parts throughout, Figure 1 is an electrical diagram showing symbolically and in one form the essential elements of my invention, and Fig. 2 a similar diagram showing certain practical modifications thereof.

Let A, Fig. 1, represent the objective point, the distance of which is to be determined.

D represents an alidade or telescope, which is first directed upon the object A.

E represents a telescope or alidade, the axis of which maintains a constant angle A E D to the axis of the telescope or alidade D while movable to and fro upon the bar F, fixed perpendicularly to the telescope or alidade D. The angle D A E of the triangle is thus rendered constant, the base D E thereof being the variable element by which the perpendicular D A of the triangle is measured when the movable telescope or alidade is brought into line at E with the object A, for instance, or at E' with the object A', as indicated by dotted lines.

B C represent an electrical conductor of uniform resisting conductibility, a fractional portion of which is included in an electric circuit, such fractional portion bearing in length, as B C, a ratio to the variable base D E of the triangle D A E, included between the lines of sight D A and E A directed upon the distant object A. The electrical resistance of the conductor B C, thus variable in predetermined relation to the base of the triangle, may be measured in the following manner: The conductor B C is included in a branch $a$ of a circuit of the battery H. A compensating-indicator I is included in a branch $b$ of the battery H.

J represents a galvanometer, the indicating-needle of which is balanced when the currents are equal in the branches $a$ and $b$, or unbalanced when such currents are differential. The contact at C of the flexible wire $a'$ is moved correspondingly with the movement of the telescope or alidade E being attached thereto, while the connection at B of the wire $a$ remains fixed.

K is a resisting-conductor, over which the index $i$ moves in electrical contact. The pivot of the index $i$ is electrically connected by the wire $b'$ with the battery H. The index $i$ is provided with a graduated dial, as indicated, from which readings corresponding with lineal measurements—such as D A or D A'—may be obtained. The galvanometer, the battery, and the dial I are assumed to be stationed at a distance from the instrument D E and its resistance-wire B C being under control of an independent observer.

As illustrated in Fig. 2, I may employ a telephonic receiver J' in connection with an induction-coil $J^2$, in lieu of a galvanometer, an interrupter $m$ being introduced whereby sound vibrations are effected. In this the balancing of the two branches $a\ b$ of the circuit will cause the sounds due to circuit interruptions to subside entirely in the telephone J'. Furthermore, in lieu of the flexible wire $a'$, I may employ parallel wires B C $B^2\ C^2$, upon which a contact $C^3$ completes the circuit, multiplying the variation of resistance for a given movement.

In operation, the telescope or alidade D being first sighted upon the distant object A, the telescope or alidade E is moved upon the bar F until its axis also coincides with the said object. An observer stationed at a distance by noting the galvanometer J or equivalent and adjusting the resistance K may determine the resistance in the conductor B C, equilibriating any position of the contact C thereon. The reading of the distance—such as D A—is then obtained from the dial I. It will be seen that by employing a plurality of conductors at B C and a single conductor I the lineal space of the readings may be amplified.

The herein-described instrumentalities may be modified in various ways, such as I have illustrated and described in a separate application, Serial No. 303,140, filed March 13, 1889.

I am aware that differential actions as exhibited between two branches of a circuit have been employed hitherto in making measurements, and I therefore do not claim the same as a part of my invention. Neither do I claim the improvement in the art of finding the range of a distant object which consists in first determining a fractional portion of a conducting-body bearing in length a ratio to the angle included between two lines of sight directed upon a distant object and, second, measuring the electrical resistance of said length, as I am not the first inventor thereof; but What I do claim, and desire to secure by Letters Patent, is—

1. The method of finding the range of a distant object, which consists in first determining a fractional portion of an electrical conducting body, which fractional portion bears in length a ratio to the variable base of a triangle included between two lines of sight converging at a constant angle upon a distant object, and, second, measuring the electrical resistance of said length.

2. The method of measuring a variable base of a triangle included between two lines of sight converging at a permanent angle upon a distant object, which consists in first including a fractional portion of a conducting body bearing in length a ratio to the said base in an electric circuit or branch of a circuit, and, second, equalizing the resistance of another circuit or branch of a circuit with the first, the said equalization being interpreted by units of lineal measurement.

JOHN RAPIEFF.

Witnesses:
 CHAS. W. FORBES,
 CHAS. HANIMANN.